US007828654B2

(12) United States Patent
Carter, Sr.

(10) Patent No.: US 7,828,654 B2
(45) Date of Patent: *Nov. 9, 2010

(54) LOCATION BASED GAMING SYSTEM

(76) Inventor: Russell O. Carter, Sr., 7806 Poitiers Dr., Houston, TX (US) 77071

( * ) Notice: Subject to any disclaimer, the term of this patent is extended or adjusted under 35 U.S.C. 154(b) by 0 days.

This patent is subject to a terminal disclaimer.

(21) Appl. No.: 12/378,664

(22) Filed: Feb. 17, 2009

(65) Prior Publication Data

US 2009/0203432 A1 Aug. 13, 2009

Related U.S. Application Data

(63) Continuation of application No. 10/119,341, filed on Apr. 9, 2002, now Pat. No. 7,510,474.

(60) Provisional application No. 60/283,059, filed on Apr. 10, 2001.

(51) Int. Cl.

| | |
|---|---|
| ***A63F 13/02*** | (2006.01) |
| ***A63F 13/10*** | (2006.01) |
| ***A63F 13/12*** | (2006.01) |
| ***G06Q 50/00*** | (2006.01) |
| ***G06F 7/04*** | (2006.01) |
| ***G08B 29/00*** | (2006.01) |
| ***H04Q 9/00*** | (2006.01) |
| ***H04L 9/32*** | (2006.01) |

(52) U.S. Cl. ............................ 463/29; 463/16; 463/25; 463/39; 463/40; 463/41; 463/42

(58) Field of Classification Search .................. 463/16, 463/25, 29, 39–42; 340/5.1–5.92; 705/18, 705/44

See application file for complete search history.

(56) References Cited

U.S. PATENT DOCUMENTS

| | | | | |
|---|---|---|---|---|
| 5,442,806 | A * | 8/1995 | Barber et al. | 455/435.2 |
| 5,618,232 | A * | 4/1997 | Martin | 463/25 |
| 5,659,544 | A * | 8/1997 | La Porta et al. | 370/312 |
| 5,761,647 | A * | 6/1998 | Boushy | 705/10 |
| 5,921,865 | A * | 7/1999 | Scagnelli et al. | 463/17 |
| 6,282,427 | B1 * | 8/2001 | Larsson et al. | 455/456.2 |
| 6,887,152 | B2 * | 5/2005 | Stanek | 463/17 |
| 7,359,719 | B1 * | 4/2008 | Duffett-Smith et al. | 455/456.6 |
| 2002/0132663 | A1 * | 9/2002 | Cumbers | 463/25 |
| 2003/0065571 | A1 * | 4/2003 | Dutta | 705/26 |
| 2003/0069059 | A1 * | 4/2003 | Stanek | 463/17 |

FOREIGN PATENT DOCUMENTS

| | | | |
|---|---|---|---|
| WO | WO 00/31989 | A2 * | 6/2000 |
| WO | WO 01/71622 | A1 * | 10/2001 |

* cited by examiner

*Primary Examiner*—Peter D. Vo
*Assistant Examiner*—Matthew D. Hoel

(57) ABSTRACT

A system for providing access to casino gaming and sports booking is provided which permits a gambler to place wagers using a location based mobile gaming unit. The gambler may access the system through a wireless network. Further, the gambler may be positioned anywhere there is an established local gaming server. A gambler profile may be provided wireless access to the local server along with the games available in the local server jurisdiction based on a global positioning of the mobile gaming unit.

30 Claims, 4 Drawing Sheets

LOCATION BASED GAMING SYSTEM

RELATED APPLICATIONS

This application claims priority to and incorporates by reference in its entirety U.S. Provisional Application No. 60/283,059 entitled Location Based Mobile Wagering System filed on Apr. 10, 2001, which is commonly owned by the inventor noted herein. This application is a continuation of and claims priority to U.S. application Ser. No. 10/119,341 filed Apr. 9, 2002, now U.S. Pat. No. 7,510,474, also commonly owned by the noted inventor.

BACKGROUND OF THE INVENTION

1. Field of the Invention

This invention relates generally to a system and method for facilitating wagering using a wireless network. In particular, the invention relates to a system and method for facilitating wagering via a mobile interface.

2. Description of the Related Art

For a gaming controller, such as a bookie, casino or the like, the amount of the revenues accumulated is directly related to the wins and losses of a particular gambler. For example, where a gambler places a wager on the outcome of an event, whether the gambler is paid winnings or must surrender his wager to the gaming controller is determined by whether the gambler is able to successfully guess the outcome of the event upon which he has placed his wager. Where the gambler guesses successfully, the gambler is paid a sum of winnings. On the other hand, where the gambler is unsuccessful in guessing the outcome of an event, the gambler must surrender his wager to the gaming controller. In the latter instance, the gaming controller may count the gambler's surrendered wager amongst the gaming controller's revenues.

Traditionally, when a gambler wishes to place a wager on the outcome of an event (e.g., sporting event) or to participate in the playing of a wager based game (e.g., casino game, such as poker, blackjack, slot machines, and the like), the gambler must be present on location to give over his wager to the gaming controller (e.g., sports book house or casino house). For example, in order for a gambler to place a wager on the outcome of sporting event, the gambler must present his wager to a "bookie" in person in order for the wager to be considered. Likewise, where a gambler wishes to take part in a casino game like, for example, five-card stud, the gambler must be physically present at the casino gaming table in order to participate in the playing of the cards.

However, this requirement that a gambler be physically present when placing a wager places a limitation on the amount of revenues a gaming controller may accumulate. That is, where a gambler is not present to make his wager, the gaming controller often will not accept the gambler's wager, thus reducing the chance that the gaming controller's revenues will increase when the gambler guesses unsuccessfully. Consequently, gaming controllers have been looking for multiple ways in which to provide access to a gambler which does not depend on the gambler's physical presence. A desired system, would allow a gambler to place a wager on the outcome of an event irrespective of whether the gambler is physically present.

One such method which allows gamblers who are remote from the casino or bookie to place wagers involves the establishment of an offsite betting location, such as an offsite betting track or offsite betting house. This situation, however, still requires the gambler to be physically present at the betting house to place his bet. In this way, the gaming controller's revenues are still limited by the required presence of the gambler.

Moreover, where a gambler is able to place a bet at a location remote from the gaming controller, such as with online betting systems, the gambler is confined to a placing his bets from a fixed betting location. For example, where a gambler uses a computer based system (e.g., a personal computer) to place his wager, the computer, such as the PC, is often fixed in that it must be directly and physically connected to a communications network like the Internet. Again, this restriction that the gambler communicates from a fixed location reduces the opportunity of game controller to increase his revenues by providing access to a gambler which does not depend on a fixed system.

Further still, in recent years on line gaming has been the subject of several legal disputes in that the gambler is provided access to a gaming controller from a location (e.g., jurisdiction) which has placed legal restrictions on gambling. Providing access to a gambler from these gambling restricted locations often exposes the gaming controller to liability for violating local gambling restriction laws. Consequently, a need exist for a system which will provide access to a gaming controller, where the system is additionally capable of determining a gamblers location and, thereby restrict access to the gaming controller based on the gambling laws where the gambler is located.

SUMMARY OF THE INVENTION

The present invention provides a method and system for providing a gambler access to a gaming controller which addresses many of the shortcomings of the prior art. In accordance with various aspects of the invention, a mobile (e.g. not fixed) system is provided wherein a gambler may place a wager on the outcome of an event irrespective of the gambler's location. In particular, a mobile gaming system provides a gambler access to a gaming controller wherein the gambler may place wagers on the outcome of the event from any location within a gaming controller's receiving area. In addition, the mobile gaming system allows the gambler to collect his winnings and surrender his wager without being required to be physically present in a gaming location.

In accordance with one aspect of the invention, a mobile gaming system is provided wherein a gambler may use a mobile gaming unit (e.g., 3G, PCS or cellular, two way pager, personal digital assistant, and the like) to placing a wager on the outcome of an event. The mobile gaming unit may be wirelessly connected to a server controlled by a gaming controller (e.g., game controller or game controller server), wherein the gaming controller's server manages the proliferation of the games or events upon which a wager may be placed. The gaming controller's server facilitates the storage and management of the events via manipulation of gambler profiles and jurisdictional profile (e.g., jurisdictionally permitted gaming opportunities) stored on a gaming account database on a home gaming registry. The server may additionally be able to report the outcome of the event to the mobile gaming unit, and arrange for the gambler to be paid winnings or to surrender his wager by, for example, increasing or decreasing the financial or merit account data with which the gambler is using to place wagers.

In accordance with one aspect of the invention, the gambler is able to place wagers on the outcome of the game or event based on the gambling profile of the gambler. The gambling profile may be further stored in a database, wherein the gambling profile provides the gambler with credits with which to gamble. Such credits may be purchased by the gambler using the mobile gambling unit, an Internet connection, or through dial-up procedures, and the like. Where the gambler successfully places a wager (e.g., correctly guesses the outcome of an event) the amount of credits stored the gambling profile may be increased accordingly to the amount of the gambler's winnings. Contrariwise, were a gambler unsuccessfully places a wager, the amount of credits stored in the gambling profile may be decreased accordingly to the amount wagered by the gambler.

In accordance with another aspect of the invention, the mobile gaming unit may wirelessly connect to a gaming controller gaming system where the mobile gaming unit is within a receiving area of a gaming controller system. In addition, the mobile gaming unit may be able to wirelessly connect to a server, or servers managed by more than one gaming controller, wherein the user's gambling profile is stored permanently or temporarily on the noted servers.

In accordance with yet another aspect of the invention, a mobile gaming unit is tracked by a position location system (e.g., a global positioning system, wireless assisted global position system or the like). The mobile gaming unit may be further activated or deactivated according to the local gambling restrictions. For example, where a mobile gaming unit is operating in a locality with a prohibition on gambling, the operation of the mobile gaming unit may be restricted accordingly. That is, certain games may or may not be provided to the gambler based on the jurisdictional restrictions.

BRIEF DESCRIPTION OF THE FIGURES

A more complete understanding of the present invention may be derived by referring to the various embodiments of the invention described in the attached documents and in conjunction with the appended drawings and figures in which like numerals denote like elements, and in which.

BRIEF DESCRIPTION OF AN EXEMPLARY EMBODIMENT

Figure 1:
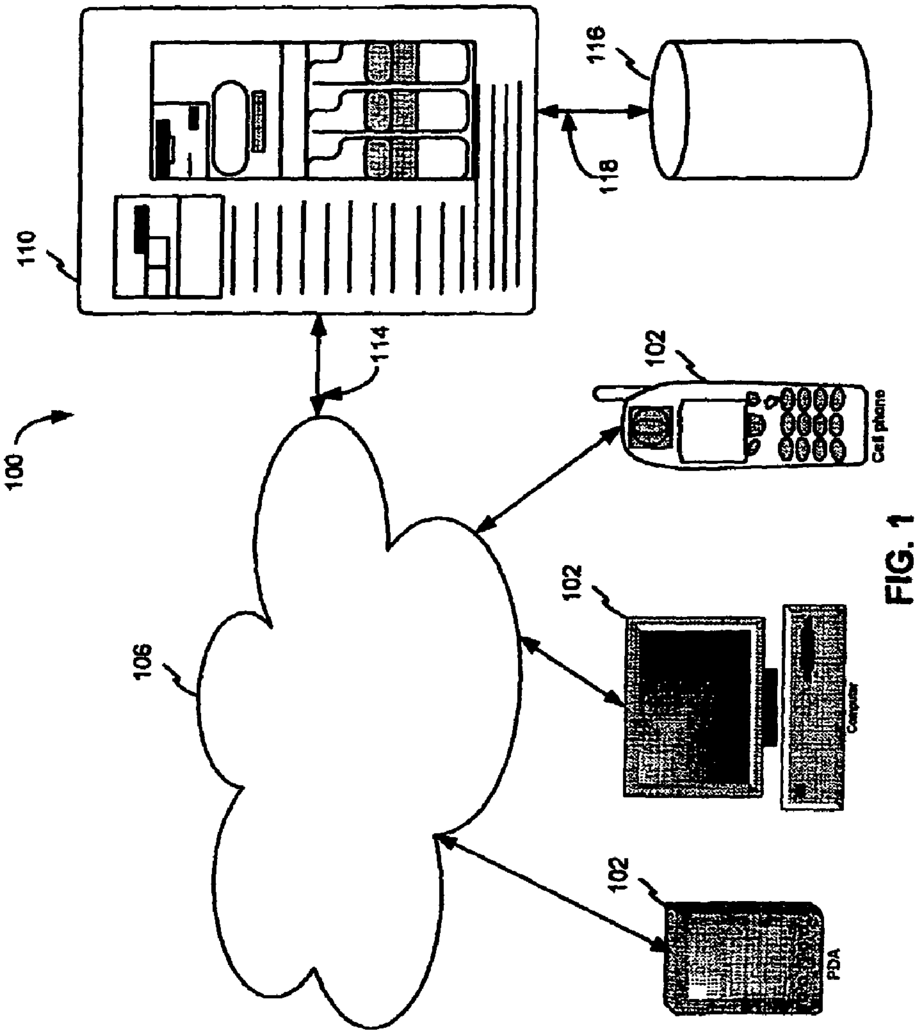
FIG. 1 is system level representation of an exemplary embodiment of a mobile gaming system in accordance with the present invention.

The present invention may be described herein in terms of functional block components and various processing steps. It should be appreciated that such functional blocks may be realized by any number of hardware and/or software components configured to perform the specified functions. For example, the present invention may employ various integrated circuit (IC) components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, or the like, with the various algorithms being implemented with any combination of data structures, objects, processes, routines or other programming elements. Further, it should be noted that the present invention may employ any number of conventional techniques for data transmission, signaling, data processing, network control, and the like. Still further, the invention could be used to detect or prevent security issues with a scripting language, such as JavaScript, VBScript or the like. For a basic introduction of cryptography, please review a text written by Bruce Schneider which is entitled "Applied Cryptography: Protocols, Algorithms, And Source Code In C," published by John Wiley & Sons (second edition, 1996), which is hereby incorporated by reference.

It should be appreciated that the particular implementations shown and described herein are illustrative of the invention and its best mode and are not intended to otherwise limit the scope of the present invention in any way. Indeed, for the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical electronic transaction or file transmission system.

To simplify the description of the exemplary embodiment, the invention is described as pertaining to a mobile wagering system capable of running over a computer network. It will be appreciated, however, that many applications of the present invention could be formulated. For example, the system could be used to facilitate wireless wagering over a network such as an intranet or extranet, or any conventional wireless communication medium, and the like. Further, it should be appreciated that the network described herein may include any system for exchanging data or transacting business, such as the Internet, an intranet, an extranet, WAN, LAN, satellite communications, and/or the like. That is, communication between the parties to the transaction and the system of the present invention is accomplished through any suitable communication means, such as, for example, a telephone network, Intranet, Internet, point of interaction device (point of sale device, personal digital assistant, cellular phone, kiosk, etc.), online communications, off-line communications, wireless communications, and/or the like. The users may interact with the system via any input device such as a keyboard, mouse, kiosk, personal digital assistant, handheld computer (e.g., Palm Pilot®), cellular phone and/or the like. Similarly, the invention could be used in conjunction with any type of personal computer, network computer, workstation, minicomputer, mainframe, or the like running any operating system such as any version of Windows, Windows NT, Windows 2000, Windows 98, Windows 95, Pocket PC, J2ME, symbian, palm operating system, (BREW) binary run time environment for wireless, MacOS, OS/2, BeOS, Linux, UNIX, or the like. Moreover, although the invention is frequently described herein as being implemented with TCP/IP communications protocols, it will be readily understood that the invention could also be implemented using IPX, AppleTalk, IP-6, NetBIOS, OSI or any number of existing or future protocols. Further, the present invention might employ any number of conventional techniques for data transmission, signaling, data processing, network control, and the like. For example, infrared, radio frequency (RF) or other wireless techniques could be used in place of any network technique described herein.

Further still, the terms "Internet" or "network" may refer to the Internet, any replacement, competitor or successor to the Internet, or any public or private inter-network, intranet or extranet that is based upon open or proprietary protocols.

Specific information related to the protocols, standards, and application software utilized in connection with the Internet may not be discussed herein. For further information regarding such details, see, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML4.0 (1997). LOSHIN, TCP/IP CLEARLY EXPLAINED (1997). All of these texts are hereby incorporated by reference.

Furthermore, the casino, bookie, user, or gambler, described herein, may represent individual people, state or private entities, or business, and while reference is made to casinos, bookies or any other gaming controller, this is by way of example and the gaming controller may represent any entity wherein a wager may be placed on the outcome of an event. The transactional account system used for facilitating betting and wager exchange includes existing proprietary networks that presently accommodate transactions for credit cards, debit cards, checking and savings withdrawal and other types of financial/banking cards, such as the American Express®, VisaNet® and the Veriphone® network, as well as, conventional avenues for establishing and facilitating charge, direct deposit or direct debit accounts.

FIG. 1 is a system level block diagram of an exemplary location based mobile gaming system 100 in accordance with this invention. With reference to FIG. 1, in general, a number of mobile gaming units 102 communicate with a server system 110 (e.g., game controller server) via a wireless network 106 to send and/or receive database files containing information related to an individual gambler profile (e.g., gambling account), as well as, files storing information on specified gaming opportunities (e.g., gambling events, lotteries, etc.) in a particular jurisdiction. In an exemplary embodiment, server 110 suitably maintains distinct data file groupings for each individual mobile gambling unit 102. The distinct data profiles may correspond to a particular gambler's demographic profile, gambling history, gambling preferences or the like. The server 110 may be configured to retrieve the distinct data files for use in permitting a gambler to place wagers using the mobile gambling unit 102. While the terms "transactional account," "gambler transaction account," "credit card accounts," "credit card" or checking or debit account may be used in the exemplary embodiments, the invention contemplates the use of any type of financial or transaction account for use in placing a wager and receiving winnings, whether or not associated with a physical card. For example, such accounts may include debit card, charge card, smart card, bar coded card, magnetic stripe card, temporary use account number, brokerage account, 401K plan, stock account, loyalty point account, telephone account, utility account, and/or the like. That is, the invention contemplates the usage of virtual credit (e.g., simulated credit accounts) stored on a remote credit virtual accounts as well as physical credit accounts.

Mobile gaming units 102 may include any convenient combination of hardware and software components configured to allow a gambler to communicate over network 106. For example, mobile gaming units 102 might include a standard personal computer (PC) comprising a CPU, monitor, storage, keyboard, mouse, wireless modem and communication hardware appropriate for a given data link 104 (e.g., V.90 modem, network card, cable modem, etc.). In alternate embodiments, mobile gaming unit 102 may be a personal data assistant (PDA) or mobile telephonic device capable of manipulating images and communicating with server 110. Mobile gaming unit 102 typically may include an operating system (e.g., Windows 95/98/2000, Linux, Solaris, MacOS, and/or the like) as well as various conventional support software modules and drivers typically associated with computers. Mobile gaming 102 may also include application software configured to communicate over network 106 with server 110, for example, a world wide web (WWW) browser or any other communication software. In an exemplary embodiment, mobile gaming unit 102 includes a conventional Internet browser application that operates in accordance with HTML and HTTP protocols such as Netscape Navigator (available from the Netscape Corporation of Mountain View, Calif.) or Microsoft Internet Explorer (available from the Microsoft Corporation of Redmond, Wash.).

Further mobile gaming units 102 are suitably operable to include conventional position location hardware and software. For example, mobile units 102 may include combination of positioning technology such as global position system (GPS), wireless assisted GPS, wireless assisted protocol (WAP) based location, geography markoff language (GML) based location. A server that may contain the location of every gaming controller (e.g., casino, hotel, sport books, server, network and riverboat) in its database.

The gaming unit may register its location with the local gaming controller server or network. The gaming controller server or network may check the gaming unit and/or gambler profile and send the profile to the local gaming controller. The local gaming controller may allow the mobile gaming unit or gambler to wager according to the profile of he mobile gaming unit or gambler.

Mobile gaming unit 102 and server 110 are suitably coupled to network 106 via data links 104, 108, 112 and 114, respectively. A variety of conventional communications media and protocols may be used for data links 104, 108, 112 and 114. Such links might include, for example, a connection to an Internet Service Provider (ISP) over the local loop as is typically used in connection with standard modem communication, cable modem, Dish networks, ISDN, Digital Subscriber Line (DSL), or various wireless communication compatible methods. Merchant system 102 might also reside within a local area network (LAN) which interfaces to network 106 via a leased line (T1, D3, etc.). Such communication methods are well known in the art, and are covered in a variety of standard texts. See, e.g., GILBERT HELD, UNDERSTANDING DATA COMMUNICATIONS (1996), hereby incorporated by reference.

Server 110 comprises any number of hardware, software, and networking components suitable to provide a user interface to a network that is accessible by users, and which provides the functionality described in further detail below. In one embodiment, Sun Ultra SPARC Enterprise 250 and 450 servers are used in conjunction with a Sun Solaris 7 or Linux operating system, Apache web server software, and an Oracle 8 or MySQL database system. Of course particular hardware and software components used in server 110 will vary widely from embodiment to embodiment. Furthermore, server 110 may represent a "cluster" or group of separate computer systems providing the functionalities described herein.

The gambler profile and mobile gaming unit identification database locations maintained on database 116 by server 110 are provided a distinct mobile gaming unit and/or gambler profile identifier (collectively "gambler information") which may be used to authenticate a user's identity. Database 116 may be a graphical, hierarchical, relational, object-oriented or other database, and may be maintained on a local drive of server 110 or on a separate computer coupled to server 110 via a local area or other network (not shown). In one embodiment, database 116 is a collection of ASCII or other text files stored on a local drive of server 110. Gambler information is suitably retrieved from database 116 upon request by mobile gambling unit 102. Further, database 116 may suitably contain distinct location information correlative to the physical location of the gaming unit 102 and the gaming opportunities permitted in the jurisdiction in which the unit 102 is located.

Further, in another alternative exemplary embodiment, the gambler information may be stored on an optional second database and an optional second server (not shown) independent of the server 110 for managing the gaming controller information wherein the optional gambler information server may maintain an optional database of like description as those above. When employing the optional database and server, the gambler information may still be provided to gaming controller server 110 to allow the gaming controller server 110 to facilitate the gambler in the placing of a wager. In this way, the optional second database storing the gambler information and the database storing the jurisdictional information may be distinct in their operation and control. That is, both the server managing the jurisdictional information and the server managing the gambler profile may be coupled and may be further capable of providing access to gaming opportunities via mobile gaming units 102 upon request by the gambler via a server application, as described more fully with respect to FIGS. 2 and 3.

In one embodiment, the gaming controller server 110 may be managed by a gaming controller (e.g., casino, bookie, banking institution etc.) with which the gambler has established a gaming transaction account. The gaming account may be associated with any suitable credit card service such as Visa®, MasterCard®, American Express®, Discover®, PayPal®, and banking institutions or the like, and may additionally allow the gaming controller to recover payment for unsuccessful wagers made through the gaming controller by an individual gambler. In addition, the gaming account may be associated with any suitable service that may allow for the gambler to be provided winnings for placing a successful wager. It should be noted that although the present invention is described with relation to a credit card service, the invention is not so limited. That is, the invention is suitable for use with any system wherein there may be provided access to a gaming controller server and/or gambler or jurisdictional information database.

As noted, within each gaming controller database location on database 116, there may be stored a plurality of individual gambler data locations corresponding to the credit accounts and/or profiles of the gamblers who have elected to enroll in the gaming controller's mobile gaming program. For example, a gaming controller may have a plurality of gamblers who have elected to subscribe to the wireless location based wagering program. Where gaming controller manages the server 110, gaming controller establishes a unique database location on database 116, which houses current gambler information related to the gambler (e.g., the amount of credit with which to wager, the gambler's name, address, billing account information, and/or preferred gaming opportunities). The database location will be assigned an identifier which can be recognized as belonging to a particular gambler.

Figure 2:
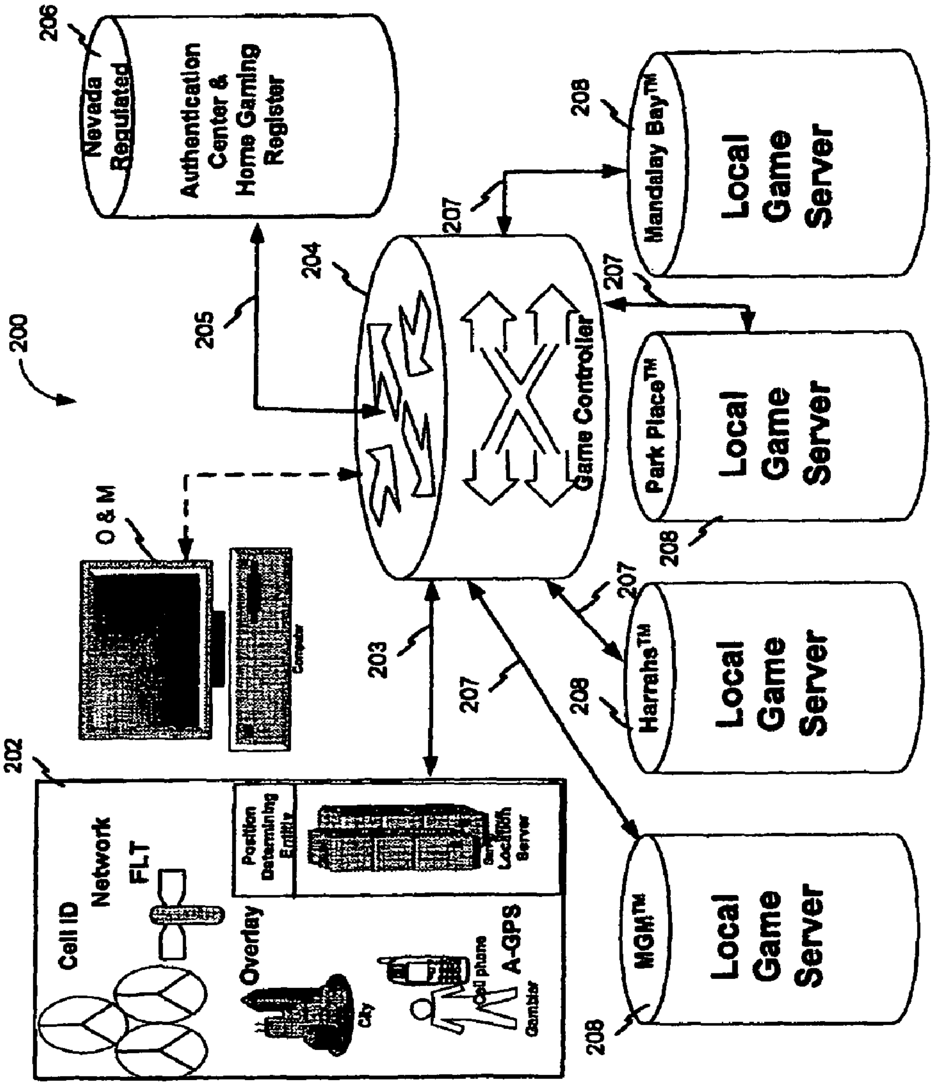
FIG. 2 is another representation of an exemplary embodiment of a location based mobile gaming system in accordance with the present invention.

FIG. 2 illustrates another exemplary embodiment of a location based mobile gaming system 200 according to the present invention. As illustrated, a wireless mobile communication system 202 may be connected to game controller 204, which may be further connected to home gaming register (HGR) system 206 via wireless communication media 203 and 205 respectively. Game controller 204 may be further connected to a plurality of local gaming servers 208 via communication media 207.

Wireless mobile communication system 202 may provide user initiated data to game controller 204. In this context, the "user initiate data" may include the user's geographical location (e.g., longitude, latitude, or a zone, or both, etc.), the user's request for accessing the system 200, and/or any user desired wagering information (e.g., desired game to play, wager to be placed, sporting event to be wagered against). In one exemplary embodiment, the gambler (e.g., "user") may access the system 200 via mobile gaming device 102 by sending a transmission signal (e.g., Code Division Multiple Access, Code Division Multiple Access 2000, Radio Frequency, General Packet Radio System, Wide Band Code Division Multiple Access, etc.) to a wireless network 106, such as, for example, Sprint PCS.TM. Nationwide Digital Wireless Network, Verizon®, etc. the wireless network 106 may further provide the transmission to a server 110 or a game controller 204.

Home gaming register (HGR) system 206 may be any system capable of managing a gambler profile and/or local game server profile 208. For example, HGR system 206 may include a database for storing the gambler profile, a jurisdictional profile, tax/tariff mapper and/or an inter-casino roaming system. HGR system 206 database may be of similar description and operation of database 116. That is, HGR system 206 database may be hierarchal or segmented into distinct storage locations wherein the various storage locations may house a plurality of distinct gambler profiles, jurisdictional profiles, tax/tariff mapper data, local game server profile and/or inter-casino roaming system indicia. In this context, a "gambler profile" may include the gambler's age, gambling history, transactional account data (e.g., credit, debit, electronic checking, merit account status), and/or the gambler security information (e.g., personal identification authorization code, biometric enabling indicia, etc.). The "jurisdictional profile" may include any information relative to the gambling restrictions and identification of the jurisdiction in from which a gambler may place his bet. Further, the "tax/tariff mapper" may be any system suitable for storing and/or managing the financial tax exchange rates and/or tax/tariff exchange agreements between states, and or countries. Further still, the "an inter-casino roaming system" may be any system and/or database capable of storing and/or managing transaction relationships between the different local gaming servers and or casino operators. In addition, the elements of HGR system 206 may be managed by a server (not shown) in similar manner as is described with respect to server 110.

In addition to the above, HGR system 206 may be configured to authenticate the user's identity prior to providing the user gaming opportunities. For example, HGR system 206 may include hardware and software applications by which the user may submit unique identifying data (e.g., person identification code, biometric information) which may corroborated against the gambler profile stored one the HGR system 206. Typical identity verification methods may be similar in operation to conventional personal identification number verification or biometric verification methods presently employed by credit card processing institutions. Such verification (e.g., authentication) of the user's identity may be established at the time the user registers the location based mobile gaming unit with the system 200 (e.g., by submitting gambler profile to HGR system 206 and upon acceptance of the gambler profile). The registration criteria may be established by the individual casino or bookie responsible for managing the operation the local games server 208.

Game controller 204 may include any network interface for communication between wireless mobile communications system 202, and any connected local gaming servers 208 or HGR systems 206. For example, game controller 204 may include a server of similar operation and description as server 110. That is, game controller 204 may be configured to manage the transmission of information between the aforementioned systems and to retrieve or receive data from any attached databases.

Local gaming server 208 may include any system configured to receive transmissions from game controller 204 and provide a listing of available gaming opportunities per the established jurisdiction. For example, each distinct local gaming server 208 may be associated with a distinct jurisdiction and/or casino, wherein the games made available to the user are restricted by the jurisdiction. That is, each jurisdiction associated with the local gaming server 208 may restrict the type of gaming activity which may be provided in that jurisdiction. As such, gaming server 208 may only store the required information (e.g., software) necessary for allowing the user to place a wager in that jurisdiction. In some instances, the server 208 may be one or more servers wherein a distinct server such as a visiting server (e.g. not shown) may be configured to receive and temporarily or permanently store the gambler profile and update the gambler profile (e.g., gambling credit, gambling limit etc.) according to the result of a gambler's bet. In this context, local gaming server 208 (and alternatively, visiting server) may have similar description and operation as server 110 and/or HGR system 206.

Figure 3A:
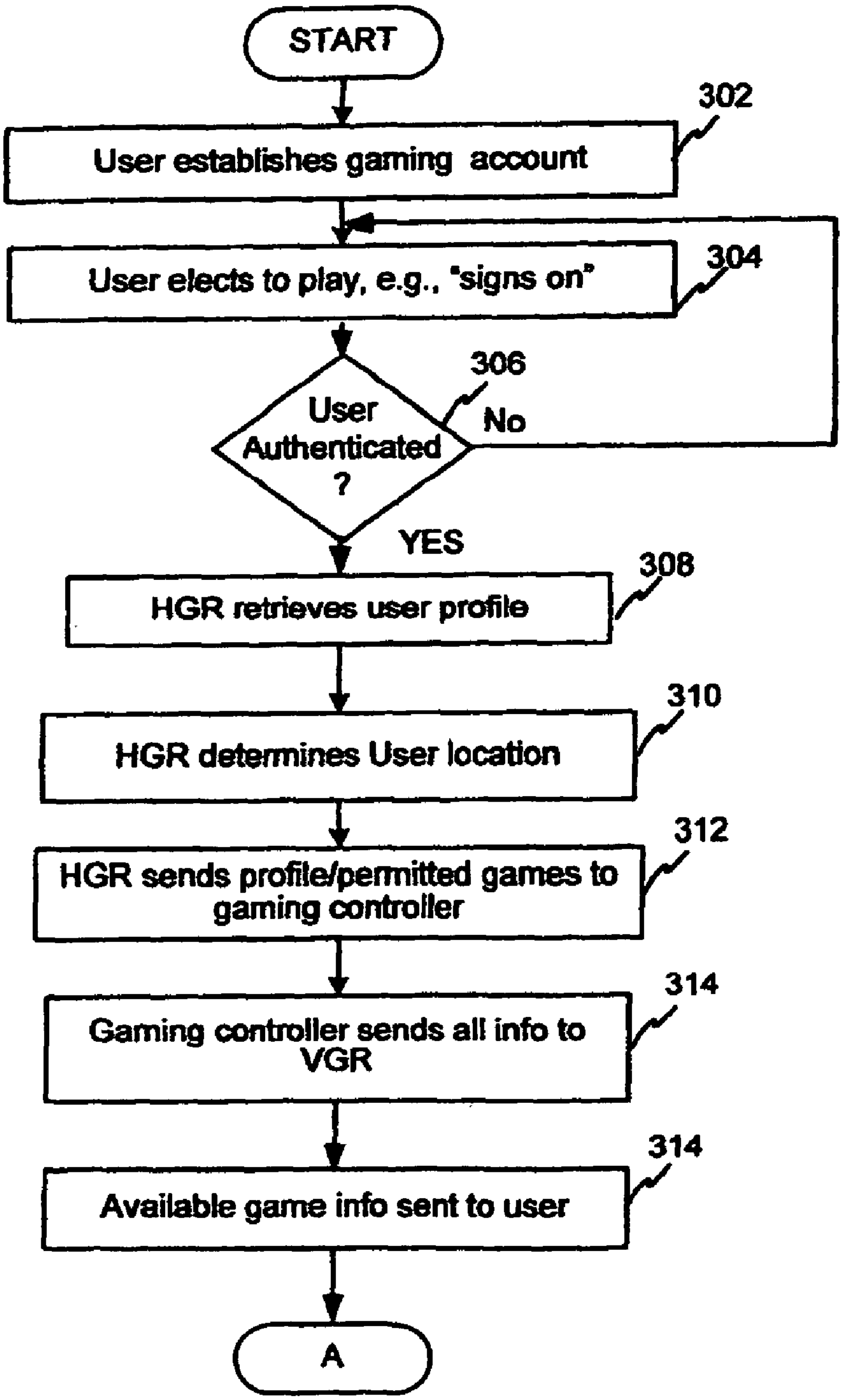
FIG. 3 is an exemplary flowchart of a method of gaming via an exemplary location based mobile gaming system in accordance with the present invention.
Figure 3B:
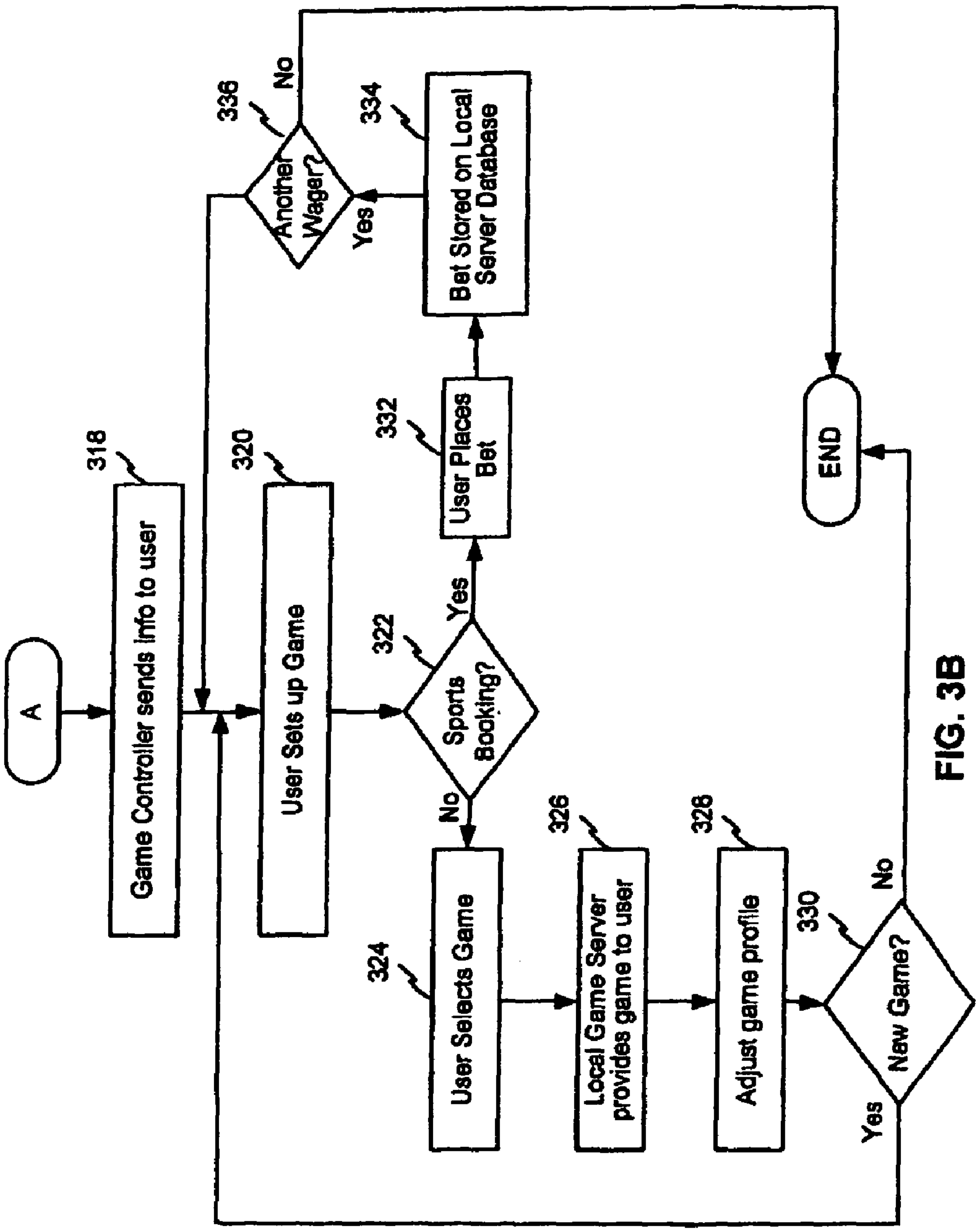

FIG. 3 depicts an exemplary flowchart which illustrates an exemplary method for practicing the system 100 or 200 of the present invention. As shown, the system 100 or 200 may begin with the user establishing a gaming account for use with the present invention (step 302). The user may undergo an age verification to determine if the user meets the minimum age requirements. Further, the user may establish a transaction account for negotiating a wager which may be associated with any credit account as described above. Further still, the user may establish a preferred local gaming server for transacting the majority of the gaming activities.

Upon establishing a gaming account, the user may initiate a gaming session by transmitting initiating information to the HGR system 206 via the wireless network 202 (step 304). The initiation information may include the user identification and/or access or security code (e.g., biometric information, personal identification information etc.). The HGR system 206 may use the provided information to authenticate the user identification and determine if the user is authorized to place wager on the system (step 306). Such authentication may include providing a personal identification number in similar manner as is done with existing credit and debit accounts. Alternatively, authentication may include providing voice or biometric identifying information, via mobile gaming unit 102. In such instance, the mobile gaming unit may be equipped with certain biometric utility applications (e.g., fingerprinting recognition, palm print recognition, etc.) and/or voice or iris recognition technology.

If the user is unauthenticated (step 306), the user may be prompted to restart the gambling access experience. If the user is authenticated (step 306), the HGR system 206 may retrieve a gambler profile from an attendant database (step 308). Further, the HGR system 310 may further retrieve identifying information regarding the jurisdiction in which the gambler is located (step 310). That is, the user may provide initiating location information (e.g., longitude, latitude, etc.) which is correlative to the jurisdiction in which the gambler (e.g., mobile gambling unit 102) is located. Upon retrieving the location information the HGR system 206 may be matched to a distinct jurisdiction (e.g., jurisdictional information).

The HGR system 206 may provide the gaming profile and/or the jurisdictional information to the gaming controller 204, which may further provide the information to the local gaming server 208 (step 314). In some instances, the jurisdictional information may be provided to a separate visiting gaming server for use in determining the available games for a particular jurisdiction. Once the gaming information is determined, information concerning the available games is forwarded to the user via the game controller 204, the wireless system 202, and more particularly via mobile gaming unit 102 (steps 316 and 318).

The gambler may then select from amongst the available games, a particular game to play (step 320). Depending on the game selected, the gambler profile may be updated in response the games outcome. That is, the gambler's preferred game, gambling history, history of wins and losses, etc. may be updated in real-time, or at the completion of the gambler's gaming experience.

In some instances, the gambler may elect to place a wager on a sporting event (steps 322 and 332). The information concerning the wager may be stored on the local server 208 (step 334). The information may be uploaded by the game controller 204 and provided to HGR system 206. The gambler may further elect to place another wager or to end the gambling process (step 336). Upon completion of the sporting event, the gaming profile and/or transaction account information may be updated according to the gambler level of success.

On the other hand, the gambler may elect to play a game wherein the results of the game are known virtually real-time (step 324). For example, such games may include virtual slot machine, keno, poker, black jack, craps, etc. The game may be managed by the local server 208. Upon determining the results of the game, the gambler profile and/or transactional account may be adjusted accordingly (step 328). That is, the credit or financial transaction account associated with the gambler's gambling experience may be deducted or increased according to the gambler's level of success. Once the game is terminated and the wager is deducted or added to the transactional account, the gambler may be given the opportunity to place another wager on a game, or to terminate the gambling experience (step 330).

It should be noted that various steps may be combined or eliminated according to the requirements of the local server. Further, the number of the components and/or descriptions of the system 100 or 200 may be manipulated or managed using additional components such as the operation and maintenance system O&M depicted in FIG. 2. TH O&M may be any system such as a standard CPU, or the like connected tot eh game controller 204. Further still, although depicted as communicating with game controller 204, the wireless communications system 202 may be configured to communicate directly with the HGR system 208.

In addition, it should be understood that although the present system is described with respect to a remote location based mobile gaming unit which initiates a gaming experience while being within the transmitting area (e.g., zone) of a distinct local game server 208, the invention contemplates the use of a location based mobile unit which is roaming from one transmission zone to another. In this instance, the user may be required to reinitiate the gaming experience under the established protocols of the zone in which the user is moving. As an example, where the user begins his gaming experience in a first zone, but the user movers to a second zone, the user may be required to restart his gaming experience under the protocol of the second zone, which may have different jurisdictional restrictions than the first zone. Alternatively, the invention contemplates that various jurisdictions may establish agreements permitting the gaming experience to be completed in the second zone even though the gaming experience was initiated in the first zone. By way of further example, where a gambler initiates a gaming experience under the established protocol of a first local server, the gambler may be permitted to continue the gambler's gaming experience under the protocol of a second local server, in the event the gambler moves from the transmission area of the first local server to the second local server. In this context, such an experience may be called a handoff, wherein the first local server "hands off" the gambler's gaming experience to the second local server.

While the above description points out various aspects of the mobile gaming system of this invention, it is to be understood that a complete understanding of the invention will be gleaned from the above description taken in conjunction with the attached figures and appended claims.

What is claimed is:

1. A location based wagering system comprising: a home game register including a home game register database, said home game register database storing a first jurisdictional profile useful for determining gambling restrictions of a first zone, said home game register database storing a second jurisdictional profile useful for determining gambling restrictions of a second zone, said home game register database including a transaction account from which a wager may be obtained, said transaction account associated with a location based mobile gaming unit, said home game register database including a gaming account for receiving gaming winnings, said gaming account associated with said location based mobile gaming unit; a first local game server located in said first zone for determining a first location determining technology for said first zone, said first local game server coupled to said home game register, said first local game server receiving said first jurisdictional profile, said first local game server permitting said game to be initiated on said location based mobile gaming unit in said first zone, said first local game server permitting a game to be played on said location based mobile gaming unit in accordance with location data, said location data being derived from data received from said first location determining technology; a second local game server located in said second jurisdiction, said second local game server coupled to said home game register for receiving said second jurisdictional profile, and wherein said game is permitted to continue gameplay on said location based mobile gaming unit in accordance with a second location data, said second location data being derived from data received from said second location determining technology, said location data being received from a wideband telecommunications network, said wideband telecommunications network including one of a position determining entity (PDE), location measurement unit (LMU), or location server for providing said first location data, wherein said second local game server comprises computer-executable instructions stored on a computer-readable medium; game controller server in communication with said home game register, said game controller server in communication with said first local game server, said game controller server receiving said first jurisdictional profile and providing said first jurisdictional profile to said first local game server, said game controller server comprising computer-executable instructions stored on a computer-readable medium; and wherein said game controller server receiving said second jurisdictional profile and providing said second jurisdictional profile to said second local game server.

2. A system according to claim 1, wherein said home game register authenticates said location based mobile gaming unit.

3. A system according to claim 2, wherein said authentication includes receiving biometric data from said location based mobile gaming unit.

4. A system according to claim 3, wherein said biometric data includes one of a finger print data, palm print data, iris print data or voice print data.

5. A system according to claim 1, wherein said first local game server is associated with said location based mobile gaming unit in accordance with a user's gaming history.

6. A system according to claim 1, further including a wager permitting transaction account associated with said location based mobile gaming unit, said wager permitting transaction account being associated with a database location on said home game register database, wherein said wager permitting transaction account is used to place a wager on said game, and wherein said wager permitting transaction account is one of a credit card account, checking account, debit account, loyalty point account, telephone account, smart card account, temporary use account, brokerage account, 401K plan account, stock market account, utility account.

7. A system according to claim 1, wherein said home game register manages transactional relationships between a first casino and a second casino during gameplay, wherein said first casino is unrelated to said second casino.

8. A system according to claim 1, wherein said home game register manages roaming agreements between a first and second carrier during gameplay, wherein said first carrier is unrelated to said second carrier.

9. A system according to claim 1, wherein said home game register manages a first casino roaming indicia and a second casino roaming indicia during game play, wherein said first casino is unrelated to said second casino.

10. A system according to claim 1, wherein said home game register manages tax/tariff exchange rates between said first jurisdictions and said second jurisdiction.

11. A method of providing location based mobile gaming comprising the steps of: wirelessly accepting a first location data at a home game register, said first location data indicating a geographic location of mobile gaming unit in a first zone receiving said first location date at a game controller for determining a game to be provided to said mobile gaming unit, said first location data including data from a combination of location determining protocols, correlating said first location data with a first local game server located in a first jurisdiction, said first local game server comprising computer-executable instructions stored on a computer-readable medium providing a first jurisdictional profile to said first local game server, permitting a game to be played on the mobile game unit over a wideband telecommunications network, the wideband telecommunications network comprising one of a position determining entity (PDE), a location measurement unit (LMU), or a location server; using a first location determining technology to determine that said first location data corresponds to a geographic location in said first zone; permitting the game to be played on said mobile gaming unit if said first location data corresponds to a geographic location in said first zone; receiving a second location data at a second local game server, said second location data indicating a geographic location of said mobile gaming unit in a second zone, said second local game server comprising computer-executable instructions stored on a computer-readable medium; using a second location technology to determine that said second location data corresponds to a geographic location in said second zone; and permitting continued gameplay on said mobile gaming unit if said second location data correlates to a geographic location in said second zone.

12. A method of claim 11, further including associating a first local game server to said mobile gaming unit according to a user's gaming history.

13. A method of claim 11, further including associating a first local game server to said mobile gaming unit in a predefined manner.

14. A method of claim 11, further including wirelessly accepting authentication data from said mobile gaming unit, wherein said authentication data is biometric.

15. A method of claim 14, wherein said biometric authentication data includes one of a finger print authentication data, palm print authentication data, iris authentication data, or voice authentication data.

16. A method of claim 11, including accepting said wager includes accepting said wager from a wager permitting transaction account, said wager permitting transaction account including one of a credit card account, checking account, debit account, loyalty point account, telephone account, smart card account, temporary use account, brokerage account, 401K plan account, stock market account, utility account.

17. A method of claim 11, further comprising deactivating said game based on movement of said location based mobile gaming unit from a first zone to a second zone.

18. A method of claim 11, further including the step of managing transactional relationships between a first zone and a second zone.

19. A method of claim 11, further including correlating said second location data to a second local game server, said local game server comprising computer-executable instruction stored on a computer-readable medium, said second local game server being correlated to a second jurisdiction; and managing roaming agreements between said first and second jurisdiction.

20. A method of claim 19, wherein managing roaming agreements includes managing tax/tariff exchange rates between said first zone and said second zone.

21. A method of claim 19, wherein managing said roaming agreements includes managing transactional agreements between said first zone and said second zone.

22. A method of claim 19, wherein managing said roaming agreements includes managing roaming indicia of a first casino and roaming indicia of a second casino during gameplay, wherein said first casino is unrelated to said second casino.

23. A method of claim 19, wherein managing said roaming agreements includes managing roaming indicia between a first casino and a second casino, wherein said first casino is unrelated to said second casino.

24. A method of claim 19, wherein managing said roaming agreements includes managing agreements between a first carrier and a second carrier.

25. A method for providing a game based on the location of a location based mobile gaming unit comprising:

receiving a first location data at a home game register, the home game register including a home game register database for storing a first jurisdictional profile and a second jurisdictional profile, the first jurisdictional profile useful for determining gambling restrictions of a first jurisdiction and the second jurisdictional profile useful for determining the gambling restrictions of a second jurisdiction;

correlating said first location data to a first local game server located in a first zone, said first local game server coupled to said home game register for receiving said first jurisdictional profile;

providing a game to said first local game server from a game controller, the game controller providing the game according to the first location data;

permitting gameplay of the game in a first zone according to said first location data;

receiving a second location data at said home game register; and permitting said gameplay of said game in a second zone according to said second location data, wherein said first location data including one of a position determining entity (POE) generated data, a location measurement unit (LMU) generated data, or location server generated data wherein said first location data is received over a wideband telecommunications network, wherein said first location data includes one of physical, zonal or jurisdictional information, and wherein said second location data including one of a position determining entity (PDE) generated data, a location measurement unit (LMU) generated data, or location server generated data wherein said second location data is received over a wideband telecommunications network, wherein said second location data includes one of physical, zonal or jurisdictional information.

26. A method for providing a game based on the location of a location based mobile gaming unit comprising:

receiving a first location data at a home game register, the home game register including a home game register database for storing a first jurisdictional profile and a second jurisdictional profile, the first jurisdictional profile useful for determining gambling restrictions of a first jurisdiction and the second jurisdictional profile useful for determining the gambling restrictions of a second jurisdiction;

correlating said first location data to a first local game server located in a first zone, said first local game server coupled to said home game register for receiving said first jurisdictional profile;

providing a game to said first local game server from a game controller, the game controller providing the game according to the first location data;

permitting gameplay of the game in a first zone according to said first location data;

receiving a second location data at said home game register; and re-initiating said gameplay of said game in a second zone according to said second location data, wherein said first location data including one of a position determining entity (PDE) generated data, a location measurement unit (LMU) generated data, or location server generated data wherein said first location data is received over a wideband telecommunications network, wherein said first location data includes one of physical, zonal or jurisdictional information, and wherein said second location data including one of a position determining entity (PDE) generated data, a location measurement unit (LMU) generated data, or location server generated data wherein said second location data is received over a wideband telecommunications network, wherein said second location data includes one of physical, zonal or jurisdictional information.

27. A method for providing a game based on the location of a location based mobile gaming unit comprising:

receiving a first location data at a home game register, the home game register including a home game register database for storing a first jurisdictional profile and a second jurisdictional profile, the first jurisdictional profile useful for determining gambling restrictions of a first jurisdiction and the second jurisdictional profile useful for determining the gambling restrictions of a second jurisdiction;

correlating said first location data to a first local game server located in a first zone, said first local game server coupled to said home game register for receiving said first jurisdictional profile;

providing a game to said first local game server from a game controller, the game controller providing the game according to the first location data;

permitting gameplay of the game in a first zone according to said first location data;

receiving a second location data at said home game register;

correlating said second location to a second local game server located in a second zone, said second local game server coupled to said home game register for receiving said second jurisdictional profile;

re-initiating said gameplay of said game in a second zone according to said second location data, wherein said first location data including one of a position determining entity (POE) generated data, a location measurement unit (LMU) generated data, or location server generated data wherein said first location data is received over a wideband telecommunications network, wherein said first location data includes one of physical, zonal or jurisdictional information, and wherein said second location data including one of a position determining entity (PDE) generated data, a location measurement unit (LMU) generated data, or location server generated data wherein said second location data is received over a wideband telecommunications network, wherein said second location data includes one of physical, zonal or jurisdictional information.

28. A method for providing a game based on the location of a location based mobile gaming unit comprising:

receiving a first location data at a home game register, the home game register including a home game register database for storing a first jurisdictional profile and a second jurisdictional profile, the first jurisdictional profile useful for determining gambling restrictions of a first jurisdiction and the second jurisdictional profile useful for determining the gambling restrictions of a second jurisdiction;

correlating said first location data to a first local game server located in a first zone, said first local game server coupled to said home game register for receiving said first jurisdictional profile;

providing a game to said first local game server from a game controller, the game controller providing the game according to the first location data;

permitting gameplay of the game in a first zone according to said first location data;

receiving a second location data at said home game register;

correlating said second location to a second local game server located in a second zone, said second local game server coupled to said home game register for receiving said second jurisdictional profile;

handing-off said gameplay of said game from said first zone to said second zone according to said second location data, wherein said first location data including one of a position determining entity (PDE) generated data, a location measurement unit (LMU) generated data, or location server generated data wherein said first location data is received over a wideband telecommunications network, wherein said first location data includes one of physical, zonal or jurisdictional information, and wherein said second location data including one of a position determining entity (PDE) generated data, a location measurement unit (LMU) generated data, or location server generated data wherein said second location data is received over a wideband telecommunications network, wherein said second location data includes one of physical, zonal or jurisdictional information.

29. A method for providing a game based on the location of a location based mobile gaming unit comprising:

receiving a first location data at a home game register, the home game register including a home game register database for storing a first jurisdictional profile and a second jurisdictional profile, the first jurisdictional profile useful for determining gambling restrictions of a first transmission area and the second jurisdictional profile useful for determining the gambling restrictions of a second transmission area;

correlating said first location data to a first local game server located in said first transmission area, said first local game server coupled to said home game register for receiving said first jurisdictional profile;

providing a game to said first local game server from a game controller, the game controller providing the game according to the first location data;

permitting gameplay of the game in a first transmission area according to said first location data;

receiving a second location data at said home game register;

correlating said second location to a second local game server located in a second transmission area, said second local game server coupled to said home game register for receiving said second jurisdictional profile;

handing-off said gameplay of said game from said first transmission area to said second transmission area according to said second location data, wherein said first location data including one of a position determining entity (PDE) generated data, a location measurement unit (LMU) generated data, or location server generated data wherein said first location data is received over a wideband telecommunications network, wherein said first location data includes one of physical, zonal or jurisdictional information, and wherein said second location data including one of a position determining entity (PDC) generated data, a location measurement unit (LMU) generated data, or location server generated data wherein said second location data is received over a wideband telecommunications network, wherein said second location data includes one of physical, zonal or jurisdictional information.

30. A method for providing a game based on the location of a location based mobile gaming unit comprising:

receiving a first location data at a home game register, the first location data being provided from a location based mobile gaming unit capable of manipulating images and communicating with a server that can link said images to a game transaction account used to place a wager on said game, and wherein said wager permitting transaction account is one of a credit card account, checking account, debit account, loyalty point account, telephone account, smart card account, temporary use account, brokerage account, 401K plan account, stock market account, utility account, the home game register including a home game register database for storing a first jurisdictional profile and a second jurisdictional profile, the first jurisdictional profile useful for determining gambling restrictions of a first transmission area and the second jurisdictional profile useful for determining the gambling restrictions of a second transmission area;

correlating said first location data to a first local game server located in said first transmission area, said first local game server coupled to said home game register for receiving said first jurisdictional profile;

providing a game to said first local game server from a game controller, the game controller providing the game according to the first location data;

permitting gameplay of the game in a first transmission area according to said first location data;

receiving a second location data at said home game register;

correlating said second location to a second local game server located in a second transmission area, said second local game server coupled to said home game register for receiving said second jurisdictional profile;

handing-off said gameplay of said game from said first transmission area to said second transmission area according to said second location data, wherein said first location data including one of a position determining entity (PDE) generated data, a location measurement unit (LMU) generated data, or location server generated data wherein said first location data is received over a wideband telecommunications network, wherein said first location data includes one of physical, zonal or jurisdictional information, and wherein said second location data including one of a position determining entity (PDE) generated data, a location measurement unit (LMU) generated data, or location server generated data wherein said second location data is received over a wideband telecommunications network, wherein said second location data includes one of physical, zonal or jurisdictional information.

* * * * *